United States Patent
Milnes et al.

(10) Patent No.: US 11,063,276 B2
(45) Date of Patent: Jul. 13, 2021

(54) PUMPLESS ELECTROCHEMICAL CELL

(71) Applicant: L3 Open Water Power, Inc., Somerville, MA (US)

(72) Inventors: Thomas Bradford Milnes, Beverly, MA (US); David Harvie Porter, Somerville, MA (US); Chloe Rose Holzinger, Sharon, MA (US)

(73) Assignee: L3 Open Water Power, Inc., Somerville, MA (US)

( * ) Notice: Subject to any disclaimer, the term of this patent is extended or adjusted under 35 U.S.C. 154(b) by 0 days.

(21) Appl. No.: 16/304,757

(22) PCT Filed: Jul. 13, 2017

(86) PCT No.: PCT/US2017/041973
§ 371 (c)(1),
(2) Date: Nov. 27, 2018

(87) PCT Pub. No.: WO2018/013836
PCT Pub. Date: Jan. 18, 2018

(65) Prior Publication Data
US 2020/0328437 A1   Oct. 15, 2020

Related U.S. Application Data

(60) Provisional application No. 62/361,965, filed on Jul. 13, 2016.

(51) Int. Cl.
*H01M 8/04276* (2016.01)
*H01M 4/46* (2006.01)
*H01M 6/34* (2006.01)
*H01M 50/73* (2021.01)

(52) U.S. Cl.
CPC ....... *H01M 8/04276* (2013.01); *H01M 4/463* (2013.01); *H01M 6/34* (2013.01); *H01M 50/73* (2021.01); *H01M 2300/0014* (2013.01)

(58) Field of Classification Search
CPC .. H01M 8/04276; H01M 2/385; H01M 4/463; H01M 6/34; H01M 2300/0014
See application file for complete search history.

(56) References Cited

U.S. PATENT DOCUMENTS

| 2,474,716 | A | * | 6/1949 | Beechlyn | ................ H01M 6/34 429/82 |
| 3,256,504 | A | * | 6/1966 | Fidelman | ................ C01B 3/061 204/248 |
| 4,035,554 | A | | 7/1977 | Halberstadt | |
| 4,269,907 | A | * | 5/1981 | Momyer | ................ H01M 6/32 429/67 |

(Continued)

OTHER PUBLICATIONS

Extended European search report for European Pat. Appl. No. 17828480.8, dated Jan. 24, 2020, 8 pages.

(Continued)

*Primary Examiner* — Stewart A Fraser
(74) *Attorney, Agent, or Firm* — Danielson Legal LLC (57) ABSTRACT

An electrochemical cell and a method of operating the same. In accordance with various embodiments, the cell includes an anode, one or more cathodes opposite the anode defining a pathway there between. Chemical reactions allow the electrolyte to flow through the defined pathway without requiring a pumping device.

20 Claims, 5 Drawing Sheets

(56) References Cited

U.S. PATENT DOCUMENTS 5,427,873 A 6/1995 Shuster
2014/0154595 A1* 6/2014 McKay ................ H01M 14/00
429/410

OTHER PUBLICATIONS

International search report for PCT/US2017/041973, dated Oct. 10, 2017, 2 pages.

* cited by examiner

PUMPLESS ELECTROCHEMICAL CELL

CROSS REFERENCE TO RELATED APPLICATIONS

The present application is a national phase application of International (PCT) Patent Appl. No. PCT/US2017/041973, filed internationally on Jul. 13, 2017, and claims the benefit of and priority to U.S. Provisional Appl. No. 62/361,965, filed on Jul. 13, 2016, the entire disclosure of each of which is incorporated by reference as if set forth in their entirety herein.

TECHNICAL FIELD

This invention generally relates to devices and methods for supplying power to underwater and/or water-activated devices.

BACKGROUND

Producing power for devices associated with sub-sea monitoring and exploration is a major challenge. Devices such as sub-sea sensors (e.g., sonobuoys, DVLs, etc.) are large consumers of undersea energy and are often deployed in remote locations. Replacing the batteries of these devices is a costly and time consuming task.

One existing technique for power generation is fossil fuel combustion which requires oxygen. Other existing techniques such as lithium ion devices require significant pressure vessels to operate at various depth levels or have low energy density.

Additionally, existing metal or water fuel cell devices often rely on a pumping device to circulate an electrolyte throughout the cell. These pumping devices inevitably require power, which becomes a parasitic loss on the cell and directly detracts from the output power and corresponding energy of the cell.

These existing cells also require pumping devices and/or valves to maintain electrolyte level within the cell. Similarly, this causes a parasitic loss on cell performance.

These problems are not limited to underwater devices, either. Outside of sub-sea applications, there are opportunities for freshwater or groundwater-activated sensor devices (and other types of devices) that are powered by metal-water fuel cell chemistries. However, a tradeoff is generally made involving the frequency of sensor measurements or the number of deployed sensor devices.

A need exists, therefore, for methods and devices for powering underwater and/or water activated devices that overcome the above disadvantages of existing techniques.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a metal-water electrochemical cell. The cell includes a metal anode within an enclosure; at least one cathode with a first surface that is adjacent to the anode and defines a pathway between the cathode and the anode; and an aqueous electrolyte that flows through the defined pathway without pumping.

In some embodiments, the cell further includes a porous or prismatic media in fluidic contact with the defined pathway. In some embodiments, the porous or prismatic media is at least one of open cell foam, a repeating structure, a functionalized surface, and an adjacent non-porous media. In some embodiments, at least one of the cell and the porous or prismatic media is in an initial compressed state and configured to subsequently expand.

In some embodiments, the electrolyte includes potassium hydroxide. In some embodiments, the cell further includes at least one outlet in the enclosure configured to release the hydrogen from the enclosure; and at least one inlet in the enclosure configured to allow water to enter the enclosure. In some embodiments, the dimensions of the at least one inlet are selected such that water enters the enclosure at a rate that at least partially offsets diffusion of the electrolyte out of the enclosure. In some embodiments, the at least one inlet is in a spiral configuration. In some embodiments, the cell further includes at least one of an electric valve device, a mechanical valve device, and a semi-permeable membrane to control the release of hydrogen from the enclosure.

In some embodiments, the electrolyte flows by at least one of natural convection, molecular diffusion, a temperature gradient, and a phase gradient.

According to another aspect, embodiments relate to a method of operating a metal-water electrochemical cell. The method includes providing a metal anode in an enclosure; providing at least one cathode in the enclosure, wherein the at least one cathode includes a first surface that is adjacent to the anode and defines a pathway between the cathode and the anode; and flowing an aqueous electrolyte in the enclosure through the pathway without pumping.

In some embodiments, the method further includes providing a porous or prismatic media in fluidic contact with the defined pathway. In some embodiments, providing the porous or prismatic media includes providing at least one of an open cell foam, a repeating structure, a functionalized surface, and an adjacent non-porous media. In some embodiments, the method further includes providing a compressed porous or prismatic media; and expanding at least one of the cell and the porous or prismatic media.

In some embodiments, the electrolyte includes potassium hydroxide. In some embodiments, the method further includes providing at least one outlet in the enclosure that is configured to release hydrogen from the enclosure; and providing at least one inlet in the enclosure that is configured to allow water to enter the enclosure. In some embodiments, providing the at least one inlet includes providing an inlet with dimensions such that water enters the enclosure at a rate that at least partially offsets diffusion of the electrolyte out of the enclosure. In some embodiments, providing the at least one inlet includes providing an inlet that is in a spiral configuration. In some embodiments, the method further includes providing at least one of an electric valve device, a mechanical valve device, and a semi-permeable membrane to control the release of hydrogen from the enclosure.

In some embodiments, the electrolyte flows by at least one of natural convection, molecular diffusion, a temperature gradient, and a phase gradient.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

The methods and devices of various embodiments described herein provide an electrochemical cell that does not require pumping devices to circulate an electrolyte. Additionally, the electrochemical cell described herein can maintain electrolyte level with no pumps and no or few valves. This enables the electrochemical cell to be produced with fewer components, thereby reducing cost and improving reliability.

The various embodiments described herein are described in the context of an aluminum-water battery/fuel cell. However, features of various embodiments described herein may be implemented with other metal/water and/or metal/air chemistries as well.

It should also be noted that the exact cell chemistry of an aluminum-water battery/fuel cell is not described herein. However, the cell chemistry and examples of cells requiring pumps can be seen in, e.g., U.S. Pat. Appl. Publ. No. 2014/0154595, the contents of which are hereby incorporated by reference as if set forth in its entirety herein.

Figure 1:
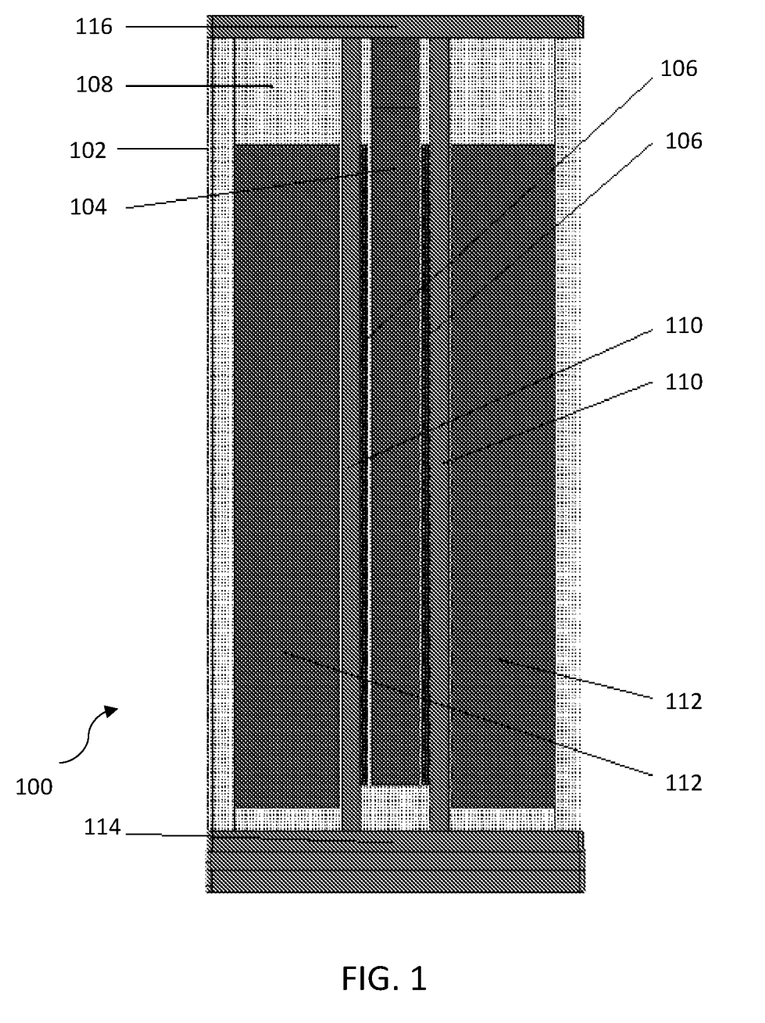
FIG. 1 illustrates a front view an electrochemical cell in accordance with one embodiment.

FIG. 1 illustrates a front view of an electrochemical cell 100 in accordance with one embodiment. The cell 100 may include an enclosure 102 that holds a metal anode 104, one or more cathodes 106, and an electrolyte 108. In this embodiment, the entire cell 100 may be submersed in water during use.

It is noted that the cell 100 of FIG. 1 is "double sided" in that both sides of the anode 104 are presented to a cathode 106 and therefore take part in the chemical reactions. However, a single-sided anode 104 (i.e., an anode that faces only one cathode 106), a triple-sided anode, a quadruple-sided anode, or a cylindrical anode may be used to accomplish the various features of the embodiments described herein.

The anode 104 may be any suitable metallic material such as aluminum. The one or more cathodes 106 may consist of any hydrogen evolving surface such as, but not limited to, platinized titanium, nickel molybdenum coated mesh or foam, or the like. If necessary, the one or more cathodes 106 may be supported by cathode supports 110 (e.g., if the cathode(s) 106 are porous and/or fragile). The electrolyte 108 may consist of a 1M aqueous KOH solution or other type of alkaline solution.

The enclosure 102 may also include one or more porous or prismatic media 112 in a space that is separated from the cathodes 106 and the anode 104 by the cathode supports 110. In other embodiments, the porous or prismatic media 112 could be located above or beneath the cathodes 106 and anode 104. In other embodiments, the outer boundaries of the space separated from the cathodes 106 and the anode 104 could be coated with a functionalized surface or other nonporous media to form a chamber. The media 112 may include porous media such as open cell foam or a repeating structure such as a prismatic honeycomb or a series of similar cross-sections or shapes (e.g., a plurality of circular straws stacked together). A chamber comprised of the space separated from the cathodes 106, the anode 104, and a non-porous media may be operably positioned adjacent to the cathode(s) 106 such as on the enclosure wall or other location to create a local region with high surface area. This configuration may be similar to how air flows over a radiator with a plurality of tubes to increase heat transfer. Accordingly, it may be desirable to position the non-porous media or functionalized surface at a location with a high surface area.

As expected with cell operation, there may be certain operating conditions in which small particle waste is generated in the electrolyte 108. In some embodiments, therefore, a chamber (or some other component included in the cell) may act as a settling chamber to separate the generated waste, such as but not limited to a chamber located beneath the cathodes 106 and anode 104.

In some embodiments, the enclosure of the cell 100 and/or the porous or prismatic media 112 may start in a compressed state such that any significant gaps (including the gap between the anode 104 and the cathode(s) 106) are initially removed. For example, in some embodiments, the cell 100 and the media 112 may start in a compressed state and expand before deployment. Or, in other embodiments, the cell 100 and the media 112 may start in a compressed state and expand during a cell startup phase. In yet other embodiments, the cell 100 and the media 112 may start in a compressed state and then expand during cell operation. These embodiments in which the cell 100 is in an initial compressed state is advantageous as the cell 100 (or cells) occupy less volume before deployment.

Figure 2A:
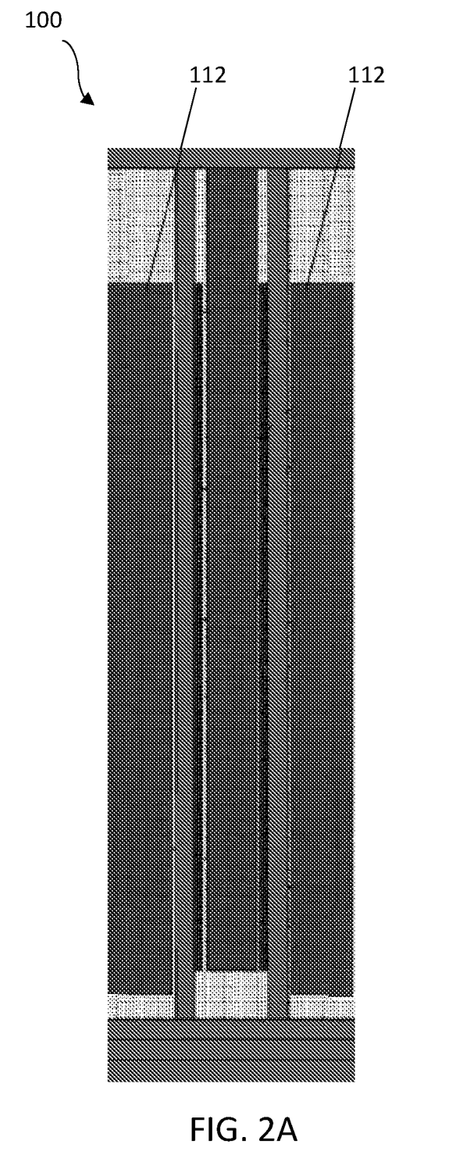
FIGS. 2A and 2B illustrate the electrochemical cell of FIG. 1 with a porous or prismatic media in a compressed state and a porous or prismatic media in an expanded state, respectively, in accordance with one embodiment.
Figure 2B:
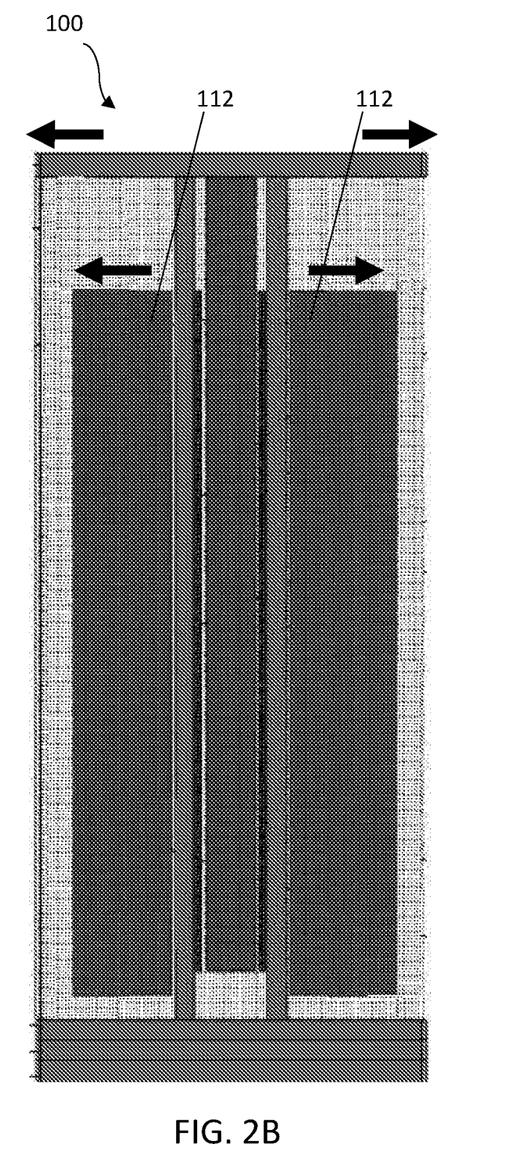

For example, FIG. 2A illustrates the cell 100 and the porous or prismatic media 112 in a compressed state. FIG. 2B illustrates the cell 100 and the media 112 in an expanded state. The expansion may occur either prior to or during use.

Although not shown in FIG. 1, the anode 104 and the cathodes 106 may be electrically connected by connections that pass through the top portion 114 of the enclosure 102.

Regardless of the exact positioning of the required electrical connections, the connections should be positioned so as to not affect cell functionality.

In the embodiment of the cell 100 shown in FIG. 1, the anode 104 and the cathode(s) 106 are adjacent to each other (but not touching) to create a pathway between said anode 104 and cathode(s) 106. Chemical reactions between the electrolyte 108 and the hydrogen evolving cathode(s) 106 cause hydrogen bubbles to be released from the electrolyte 108. The rising hydrogen bubbles, along with the marginally heated electrolyte, therefore create an electrolyte flow from the bottom of the cell 100 (near the bottom portion 114), through the defined pathway between the anode 104 and the cathode(s) 106, and towards the top portion 116 of the cell 100.

Figure 3:
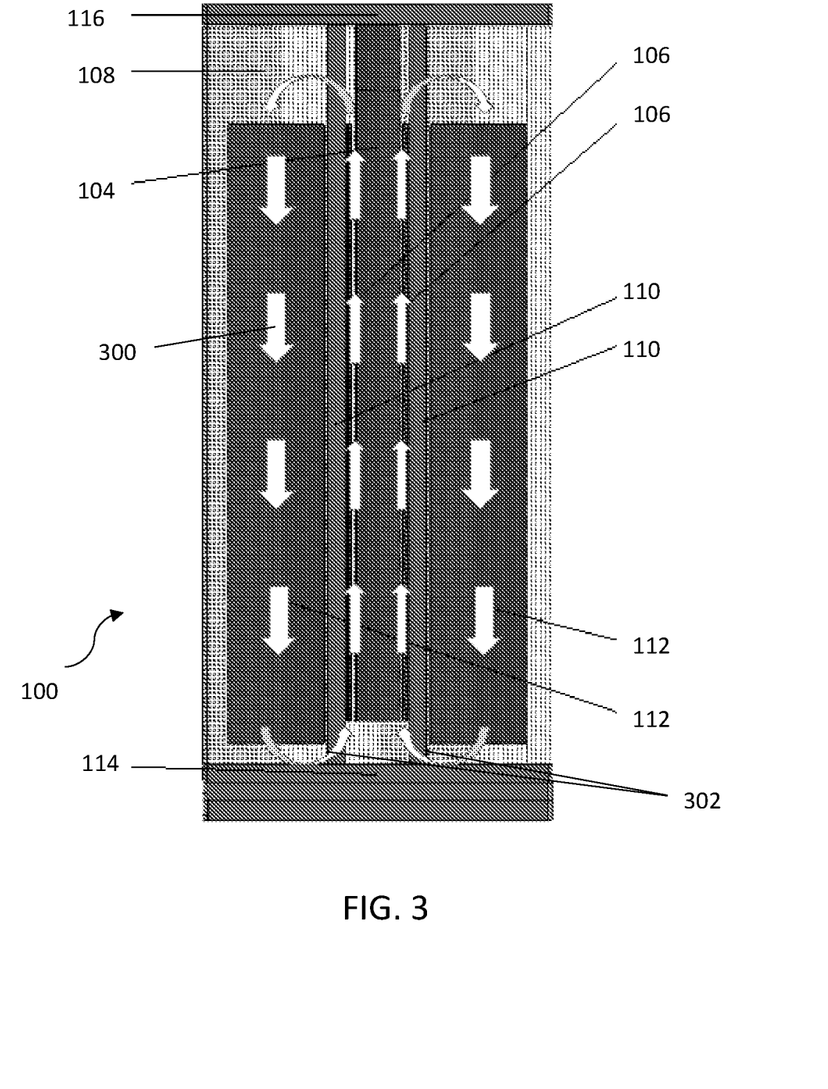
FIG. 3 illustrates the electrolyte flow of the electrochemical cell of FIG. 1 in accordance with one embodiment.

FIG. 3 illustrates the direction of the electrolyte flow (indicated by arrows 300) in the cell 100 of FIG. 1. The rising electrolyte 108 results in a low pressure region towards the bottom of the cell 100. In other words, the upward flow of the electrolyte 108 through the pathway between the anode 104 and cathodes 106 draws up the electrolyte 108. The electrolyte 108 is then drawn through porous or prismatic media 302 at the bottom of the cell 100 to complete the flow loop 300.

Accordingly, this flow loop 300 of FIG. 3 serves the same function as actively pumping an electrolyte through existing cells. Rather than relying on pumping devices, however, features of the various embodiments described herein only rely on the natural convective flow (as opposed to forced convection caused by a pumping device) that is generated by the rising hydrogen and/or the heated electrolyte to drive the electrolyte flow 300. Since both of these forces are byproducts of the reaction chemistry, no power is lost and no external power source is required to circulate the electrolyte 108. In some embodiments, the natural convective flow 300 may be generated by molecular diffusion, by a temperature gradient, and/or by a phase gradient.

As mentioned previously, various embodiments of the cell 100 described herein are able to maintain electrolyte level without a pumping device and without or with only a few valve devices. Referring back to FIG. 1, in order for the cell 100 to function as intended the electrolyte level should remain above the cathodes 106. The electrolyte 108 level should also be such that a gas layer remains at the top of the cell 100 to prevent the electrolyte 108 from leaking out of the enclosure 102. Water may therefore be added to the cell 100 using an inlet as it is consumed by the water splitting cathodes 106 to maintain this electrolyte level. However, the hydrogen produced by the cell must be released.

Figure 4:
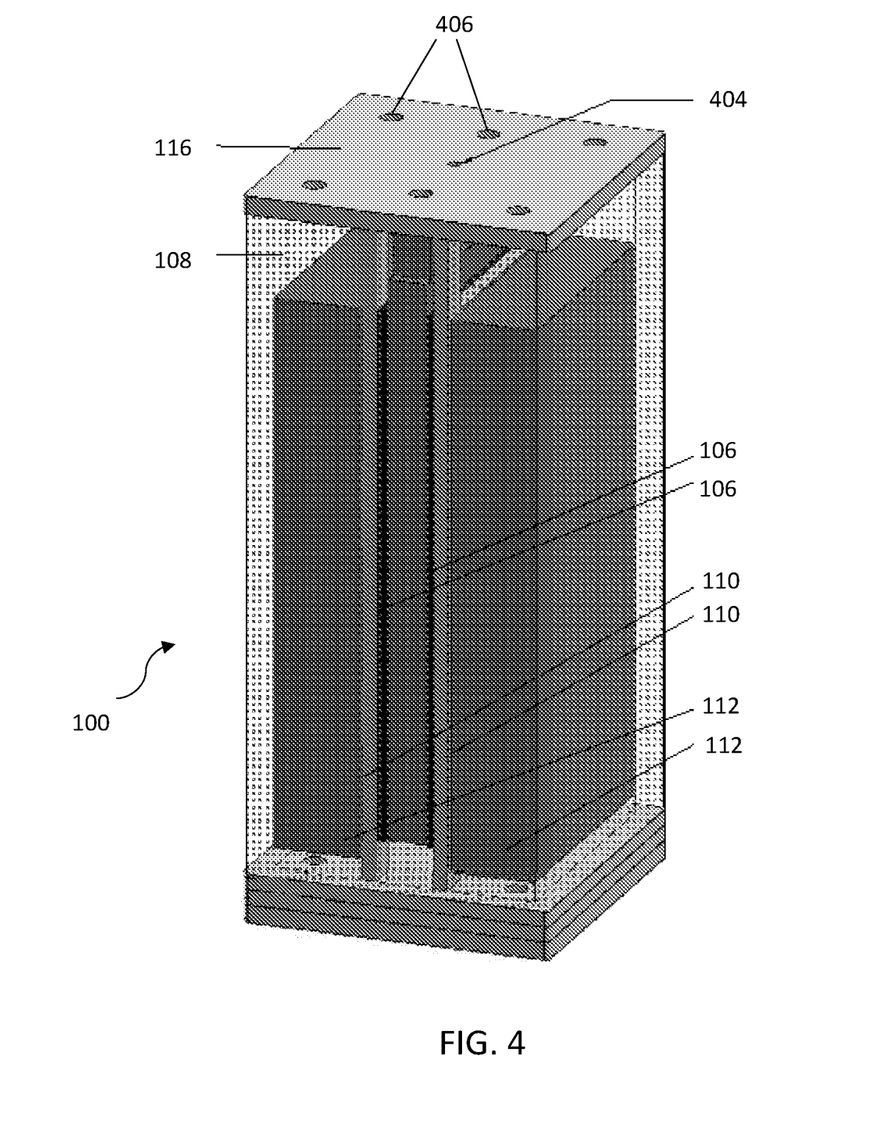
FIG. 4 illustrates an isometric view of the electrochemical cell of FIG. 1 in accordance with one embodiment.

This balance is achieved by having a cell outlet that releases hydrogen in a controlled fashion to maintain a certain electrolyte level and also by having an inlet that allows ambient water to enter the cell 100. FIG. 4 illustrates an isometric view of the electrochemical cell 100. As seen in FIG. 4, the top portion 116 includes outlet ports 404 and 406.

The top portion 116 need not be a flat portion as illustrated in FIG. 4. Rather, the top portion 116 may be domed or angled such that one or more outlet ports are positioned along the angled or dome portion. This configuration may assist in directing the hydrogen towards the outlet port(s).

The sizes of the outlet ports 404 and 406 may be chosen such that static pressure produced by surface tension at the outlet ports 404 and 406 helps control the electrolyte level in the cell 100. A smaller outlet port diameter may result in a higher static pressure and therefore a lower level of the electrolyte 108. On the other hand, a larger outlet port diameter may result in a lower static pressure and a higher level of the electrolyte 108.

When hydrogen is produced in the cell 100 from chemical reactions, the pressure on the outlet ports 404 and 406 is increased and overcomes surface tension, thereby releasing a bubble. This maintains approximately the same pressure in the cell 100 and therefore approximately the same electrolyte level. In one alternative embodiment, the cell 100 may also include one or more outlet tubes from the outlet ports, the exit of which are positioned at the desired electrolyte level.

In another embodiment, the cell 100 may also include one or more electrically controlled valves or one or more mechanical check valves to control the electrolyte level. While valve operation may consume energy, the required energy would still be less than the energy that would typically be required for a pumping device.

In some embodiments, the cell 100 may include a flapper valve and/or a float valve to help manage the electrolyte level. In addition to or in lieu of valve devices or the outlet ports, the cells of various embodiments may also include a semi-permeable membrane to control the release of hydrogen from the cell.

As mentioned previously, the cell 100 may also include an inlet to allow ambient water to enter the cell 100 in a controlled manner. However, the inlet should be configured to not allow the electrolyte 108 (e.g., KOH) to diffuse too quickly out of the cell. To accomplish this, the inlet may be configured with a small enough cross section and a large enough length such that the consumption of water within the cell 100 pulls in water at a rate that partially or completely offsets diffusion of the electrolyte 108 out of the enclosure 102.

Figure 5:
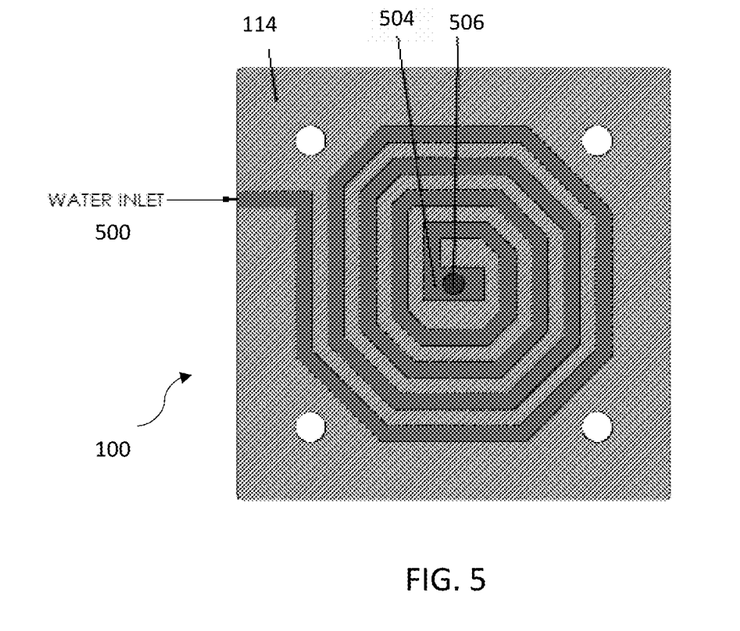
FIG. 5 illustrates a spiral inlet of the electrochemical cell of FIG. 1 in accordance with one embodiment.

FIG. 5, for example, illustrates an exemplary water inlet 500 in the bottom portion 114 of the cell 100. As seen in FIG. 5, the water inlet 500 is in the shape of a spiral configuration that runs throughout the bottom portion 114 of the cell 100. This spiral configuration may be referred to as a "tortuous path" 504 that ends at the entrance 506 to the cell 100.

This length therefore allows water to slowly enter the cell 100 at a rate that at least partially offsets the diffusion of the electrolyte 108 out of the cell 100. Accordingly, this removes the need for an inlet valve device.

In some embodiments, the inlet path 504 may be designed such that a desired amount of the electrolyte is lost over time to, for example, maintain a particular electrolyte concentration range as waste product consumes water and increases in volume within the cell 100.

Although not required, the inlet may nonetheless be configured with one or more valve devices. Any used valve devices may be in communication with a remote trigger to be opened/closed remotely. In these embodiments, the cell 100 may be deployed "dry" with the salts required to make the electrolyte 108 in an initial solid form. The remote trigger may then open the inlet valve to a water source to start the cell remotely after the initial deployment of the cell.

In other embodiments, the cell 100 may be configured without any specialized electrolyte level management devices. In these embodiments, the cell 100 may load itself or otherwise be loaded with a certain volume of electrolyte that can be equal to or in excess of the total quantity of water required to fully react with the metal anode prior to operation. That is, the anode 104 may be consumed and the cell 100 reaches the end of its life before or simultaneously with the electrolyte 108 being consumed.

It follows that these embodiments do not require a dynamic inlet system to draw water or other chemical species from the environment. Accordingly, this further simplifies the design and manufacturing of the cell.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A metal-water electrochemical cell, the cell comprising:
   a metal anode within an enclosure;
   at least one cathode with a first surface that is adjacent to the anode and defines a pathway between the cathode and the anode;
   a porous or prismatic media within the enclosure; and
   an aqueous electrolyte that flows through the defined pathway without pumping, wherein:
      the electrolyte flows by at least one of molecular diffusion, a temperature gradient, or a phase gradient and
      the porous or prismatic media is configured to expand in a direction away from the anode and the at least one cathode.

2. The cell of claim 1 wherein the porous or prismatic media is in fluidic contact with the defined pathway.

3. The cell of claim 1 wherein the porous or prismatic media is at least one of open cell foam, a repeating structure, a functionalized surface, and an adjacent non-porous media.

4. The cell of claim 1 wherein at least one of the cell and the porous or prismatic media is in an initial compressed state and configured to subsequently expand.

5. The cell of claim 1 wherein the electrolyte includes potassium hydroxide.

6. The cell of claim 5 further comprising:
   at least one outlet in the enclosure configured to release the hydrogen from the enclosure; and
   at least one inlet in the enclosure configured to allow water to enter the enclosure.

7. The cell of claim 6 wherein the dimensions of the at least one inlet are selected such that water enters the enclosure at a rate that at least partially offsets diffusion of the electrolyte out of the enclosure.

8. The cell of claim 6 wherein the at least one inlet is in a spiral configuration.

9. The cell of claim 6 further comprising at least one of an electric valve device, a mechanical valve device, and a semi-permeable membrane to control the release of hydrogen from the enclosure.

10. The cell of claim 1 wherein the electrolyte flows by at least one of molecular diffusion or a temperature gradient.

11. A method of operating a metal-water electrochemical cell, the method comprising:
    providing a metal anode in an enclosure;
    providing at least one cathode in the enclosure, wherein the at least one cathode includes a first surface that is adjacent to the anode and defines a pathway between the cathode and the anode; and
    flowing an aqueous electrolyte in the enclosure through the pathway without pumping, wherein the electrolyte flows by at least one of molecular diffusion, a temperature gradient, or a phase gradient.

12. The method of claim 11 further comprising providing a porous or prismatic media in fluidic contact with the defined pathway configured to expand in a direction away from the anode and the at least one cathode.

13. The method of claim 12 wherein providing the porous or prismatic media includes providing at least one of an open cell foam, a repeating structure, a functionalized surface, and an adjacent non-porous media.

14. The method of claim 12 further comprising:
providing a compressed porous or prismatic media; and
expanding at least one of the cell and the porous or prismatic media.

15. The method of claim 11 wherein the electrolyte includes potassium hydroxide.

16. The method of claim 15 further comprising:
providing at least one outlet in the enclosure that is configured to release hydrogen from the enclosure; and
providing at least one inlet in the enclosure that is configured to allow water to enter the enclosure.

17. The method of claim 16 wherein providing the at least one inlet includes providing an inlet with dimensions such that water enters the enclosure at a rate that at least partially offsets diffusion of the electrolyte out of the enclosure.

18. The method of claim 16 wherein providing the at least one inlet includes providing an inlet that is in a spiral configuration.

19. The method of claim 16 further comprising providing at least one of an electric valve device, a mechanical valve device, and a semi-permeable membrane to control the release of hydrogen from the enclosure.

20. The method of claim 11 wherein the electrolyte flows by at least one of molecular diffusion or a temperature gradient.

* * * * *